Dec. 11, 1951 S. B. PICKLES 2,577,804

RADIO ANTENNA

Filed March 2, 1945 6 Sheets-Sheet 1

INVENTOR.
SIDNEY B. PICKLES

BY

R P Morris
ATTORNEY

INVENTOR.
SIDNEY B. PICKLES

BY

ATTORNEY

Dec. 11, 1951 S. B. PICKLES 2,577,804

RADIO ANTENNA

Filed March 2, 1945 6 Sheets-Sheet 3

INVENTOR.
SIDNEY B. PICKLES

BY

R. F. Morris
ATTORNEY

RADIO ANTENNA

Filed March 2, 1945 6 Sheets-Sheet 4

INVENTOR.
SIDNEY B. PICKLES

BY

R. P. Morris
ATTORNEY

Dec. 11, 1951 S. B. PICKLES 2,577,804

RADIO ANTENNA

Filed March 2, 1945 6 Sheets-Sheet 5

INVENTOR.
SIDNEY B. PICKLES

BY

R. P. Morris
ATTORNEY

Dec. 11, 1951 S. B. PICKLES 2,577,804

RADIO ANTENNA

Filed March 2, 1945 6 Sheets-Sheet 6

INVENTOR.
SIDNEY B. PICKLES

BY

[signature]
ATTORNEY

Patented Dec. 11, 1951 2,577,804

UNITED STATES PATENT OFFICE 2,577,804

RADIO ANTENNA

Sidney B. Pickles, Jackson Heights, N. Y., assignor to Federal Telephone and Radio Corporation, New York, N. Y., a corporation of Delaware Application March 2, 1945, Serial No. 580,674

3 Claims. (Cl. 250—33.65)

This invention relates to radio beacons and more particularly to radiation screening arrangements to minimize the radiation effect of radio beacons or other radiators in selected angular directions.

In radio beacons, particularly localizer beacons, or radio course beacons, reflecting objects within several hundred feet of the transmitter may cause bends, multiple courses or low clearance angles and so forth. Several systems have been used for reducing these errors, one of which is the reduction of the signal strength directed toward the reflecting objects, with respect to the signal strength along the course. Particularly in portable localizer beacons it is very difficult to select a site where there will be no reflecting objects. It is therefore desirable to provide some type of screening to effect the desired corrections in the radiation pattern which is at least semi-portable in nature and with which the radiation pattern may be readily predicted. Short screens arranged behind the radiators tend to increase the front-to-back signal ratio and thus to cut down the strength of the energy radiated toward reflecting objects in the rear of the antenna. Such screens may also produce radiation minima in the forward directions if the spacing from the antenna is sufficiently large.

However, the small easily portable screens do not lend themselves readily to mathematical prediction of their operation since their lengths are such as to allow resonance to exist in the screens. Further, since these screens are generally resonant their location with respect to the beacon antenna array are critical and can be determined only by trial and error.

With the limitations inherent in small screens in view, it is an object of my invention to provide screening arrangements for radio antennas which though not infinite in length are substantialy equivalent to infinite length screens.

It is a further object of my invention to provide screens arranged for mounting behind an antenna in which the screens are substantially aperiodic at all the operating frequencies.

It is a still further object of my invention to provide screens which may be adjusted in spacing to the rear of the radiating antenna to provide readily predictable radiation minima in the forward direction at desired angles.

While the positioning of screens behind the antenna to minimize radiation over small angles directed toward smaller reflecting objects will serve to minimize these effects, there are often located in the area of a radio beacon relatively extensive reflecting objects such as power lines, groups of trees or hills. If these are at the rear of the beacon, the screen in back of the radiator serves to reduce effectively the reflection and re-radiation from these objects. However when they are located forwardly of the beacon at an angle to the course, the effects cannot so easily be compensated.

Accordingly, it is a further object of my invention to provide a horizontal screen arranged at a height lower than the radiating antennas and extending forwardly thereof over a predetermined angle to reduce the effective radiation height of the antenna over predetermined angular directions to thus reduce radiation in these given directions.

It is a still further object of my invention to provide a system for controlling the effective radiation of an antenna in predetermined desired directions.

It is a still further object of my invention to provide a system combining the effects of the rear radiation screen and the artificial elevated ground effects produced around a radiator or radio beacon.

According to a feature of my invention, a radiation screen comprising a plurality of wires may be mounted at a given distance preferably a wave-length or more to the rear of the antenna. These wires then are terminated in their characteristic impedance so that resonance of the wires will not occur. The termination may comprise an extension of the wire brought substantially asymptotically toward the surface of the earth or may comprise highly resistant wire fastened to the ends of the screens themselves.

For the purpose of reducing radiation over a relatively wide angle in the forward directions of the antenna, I provide a screening network of wires mounted above the surface of the earth and below the antenna at a predetermined distance. These wire screens are caused to extend forwardly over an angle depending upon the angle at which the radiation is desired to be reduced and preferably are each terminated in a characteristic impedance to prevent standing waves and radiation effects from occurring in these wires. Preferably, the wires of this horizontal screen most nearly approaching the desired direction of radiation are spaced at different levels above the surface of the ground to minimize the effect of abrupt change of continuity of the effect of the surface. It will be apparent that the screen serves to provide artificial ground effects in the directions in which the radiation is to be minimized. Since this artificial ground is higher than the natural earth the effective height of the antenna and consequently the radiation will be lower over the angles covered by the antennas.

While I have outlined above some objects and features of my invention, a better understanding of my invention and the objects and features thereof may be had from the specific description of a few embodiments thereof made with reference to the accompanying drawings, in which:

Figs. 11, 12 and 13 are patterns illustrating the effect on the localizer of the screens placed behind the beacon at selected different spacings;

Figure 1:
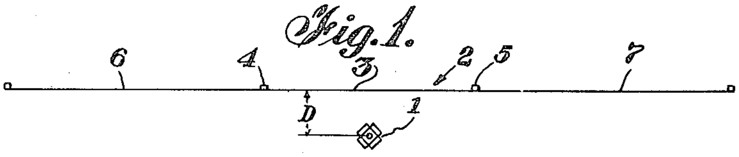
Figs. 1 and 2 are plan and elevational views, respectively, of a screen positioned behind an antenna in accordance with the principles of my invention.
Figure 2:
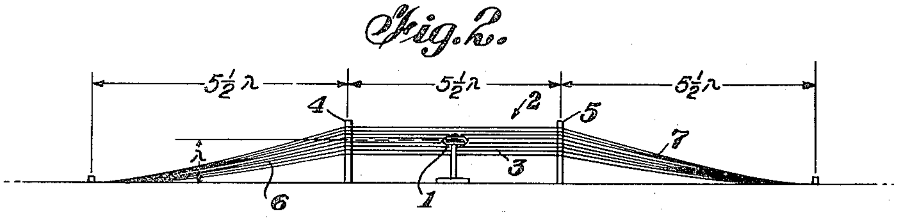

Turning first to Figs. 1 and 2, a radio antenna 1 is shown mounted a predetermined distance D in front of a reflecting screen 2. Distance D is preferably made ½ wavelength or greater. The screen 2 is shown as comprised of a central part 3 mounted between two supports 4 and 5 and two terminal parts 6 and 7 constituting extensions of the screen 3 which approach the earth asymptotically. The effective screen may be considered as being part 3 and the extensions 6 and 7 as terminations for this screen. Preferably, part 3 is made of medium length, for example in the order of four to eight wavelengths so as to provide a relatively large shielding screen behind the antenna 1. Screen 3 is preferably made up of a plurality of separate wires which may be strung relatively closely together on vertical supports and which should extend for a given distance above and below antenna 1. It is known that if wire is caused to approach the earth substantially asymptotically as shown, this will serve substantially to match the impedance of the wire so that no standing waves will be produced therein. Accordingly, there will be no appreciable standing waves produced in screen 2 and therefore no appreciable radiation.

Figure 2A:
Fig. 2A is a modification of the arrangement illustrated in Figs. 1 and 2.

Although the simplest screen to set up in the field may be one made of simple wires as shown in Figs. 1 and 2, the essential requirement is that the wires of the screen each be terminated in their characteristic impedance. Accordingly, as shown in Fig. 2A the antenna 1 may be mounted in front of a screen 2*a*, the opposite ends of the effective screening wires being connected to high resistance elements 8 and 9 which have the value of the characteristic impedance of each individual wire of the screen. Thus there is provided a reflecting screen substantially effectively of infinite length so that the screen is substantially aperiodic at the operating frequencies.

Figures 3, 4:
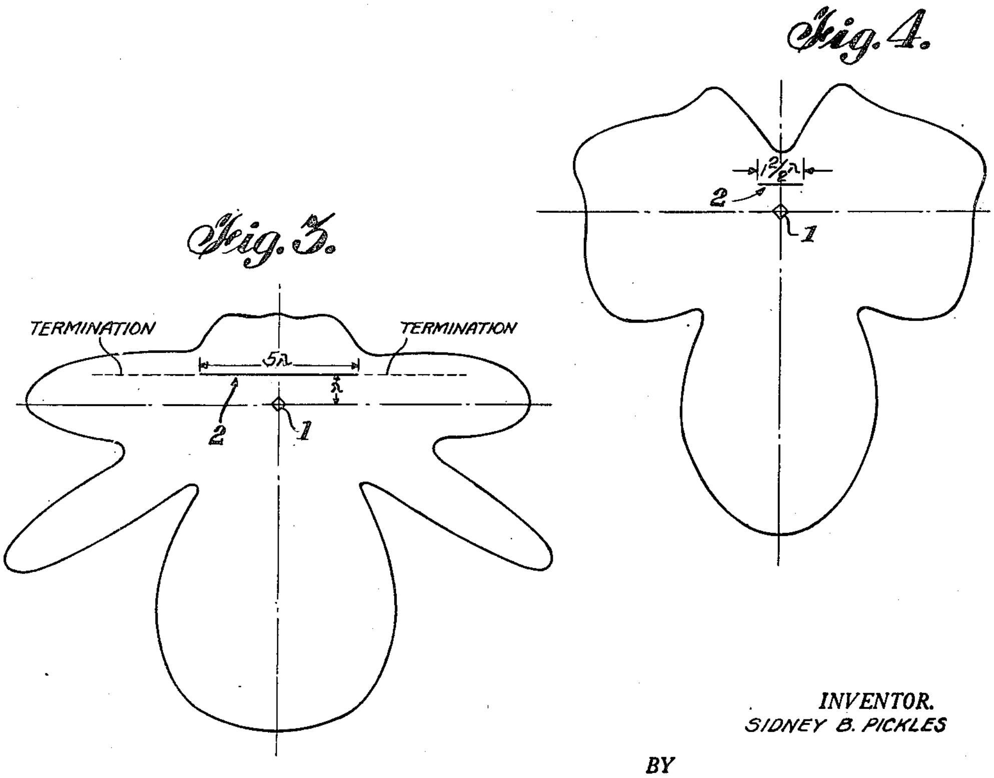
Fig. 3 is a radiation diagram produced by a system such as shown in Figs. 1 and 2.
Fig. 4 is a radiation diagram illustrating the effect of a relatively small screen arranged behind a radiator.

In Fig. 3 is illustrated a radiation diagram of a horizontal loop antenna producing substantially horizontally polarized energy arranged one wavelength in front of a screen in accordance with Figs. 1 and 2. The screen is made with the central portion 3 substantially five wavelengths long and the terminating conductors each substantially the same length. It will be noted that with this arrangement the radiation rearwardly of the antenna is reduced to a very low value. Also at a forward angle of about 48° the radiation is relatively low. Thus this screen will effectively serve to reduce the interference caused by reflecting objects located to the rear of the antenna and in the forward directions at approximately 48° from the forward line direction. A second lesser minima occurs at about 75° from the forward line direction of the antenna. By changing the spacing between the loop and the radiator, the forward minima of the antenna may be controlled to occur at different angles.

In Fig. 4 is illustrated the radiation pattern from a loop antenna 1 with a short, unterminated screen approximately ½ wavelength long arranged one wavelength behind the antenna. It will be noted from this figure that such short screening does not reduce the back radiation very sharply except for a small angle immediately behind the reflector and does not produce any very sharp minima in the forward directions.

Figure 5:
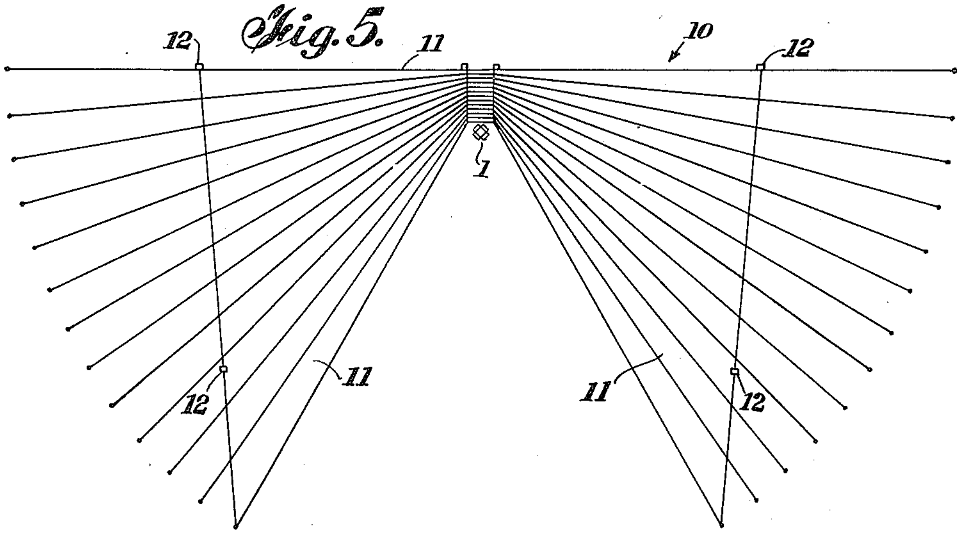
Figs. 5 and 6 are plan and elevational views, respectively, of a horizontal radiation screen in accordance with the principles of my invention.
Figure 6:
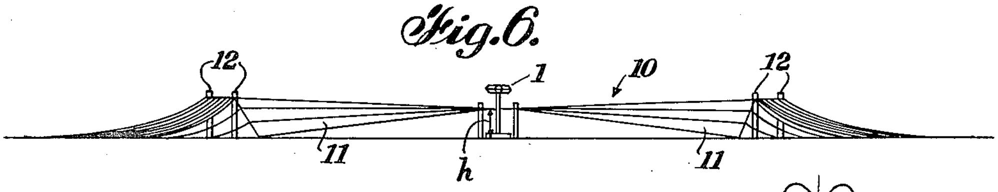

In Figs. 5 and 6 is illustrated the structural arrangement of a horizontal screen arranged to reduce the radiation from antenna 1 over a given relatively wide forward angle. The horizontal screen 10 is arranged above the surface of the earth a given height $h$, herein about half way between the antenna and earth, effectively reducing the radiation height of the radiator over this area to about ½ the actual height above the ground. The wires 11 of this horizontal screen are supported by posts 12 so as to extend horizontally for a given distance ahead of the antenna. The wires are then terminated as illustrated by bringing the wires gradually toward the ground in a manner similar to the termination of the vertical screen of Fig. 2. It should be clear, however, that other types of termination such as shown in Fig. 2A may be also used if desired. In order partially to reduce distortion effects of the pattern due to the discontinuity of effective ground height, the first few wires 11 are arranged at different heights in steps above the ground until the full height $h$ is reached. The screen as illustrated covers all of the forward angles except substantially 30° on either side of the course. This screen serves to decrease the effective height of the loop antenna in a direction from about 45° on either side of the course up to about 120°.

Figure 7:
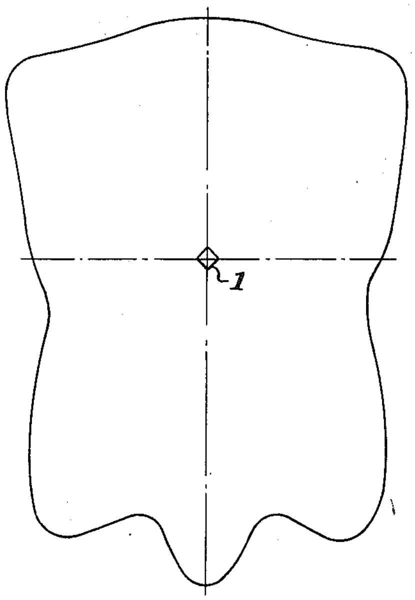
Fig. 7 is a radiation diagram such as produced by the system of Figs. 5 and 6.

In Fig. 7 is shown radiation diagram of a single loop antenna 1 with two fan-shaped horizontal screens such as previously described.

Figure 8:
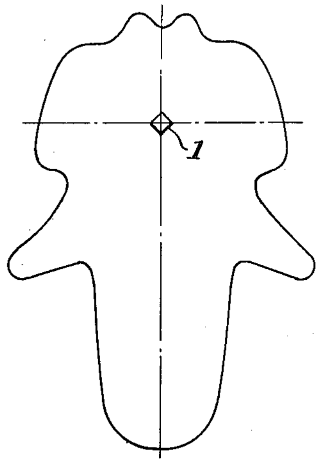
Fig. 8 is a radiation diagram illustrating the effect of a combination of the systems illustrated in Figs. 1, 2, 5 and 6.

In Fig. 8 is shown the radiation pattern produced by a combination of a vertical screen mounted about 1½ wavelengths behind the antenna and two horizontal radiation screens of the type illustrated in Figs. 5 and 6.

From the foregoing illustrations the effect of horizontal and vertical screens on the radiation patterns of a single antenna will be seen. However, the system is principally useful in correcting radiation reflections used with a course or localizer beacon since in such beacons reflections or reradiations may cause harmful effects.

Figure 9:
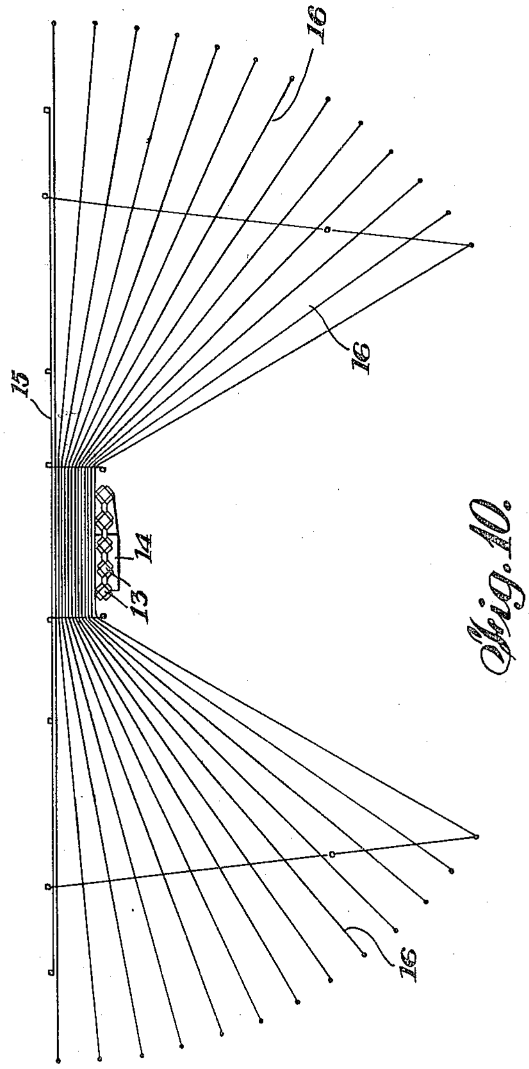
Figs. 9 and 10 are plan and elevational views, respectively, of localizer radio beacon utilizing screens in accordance with my invention.
Figure 10:
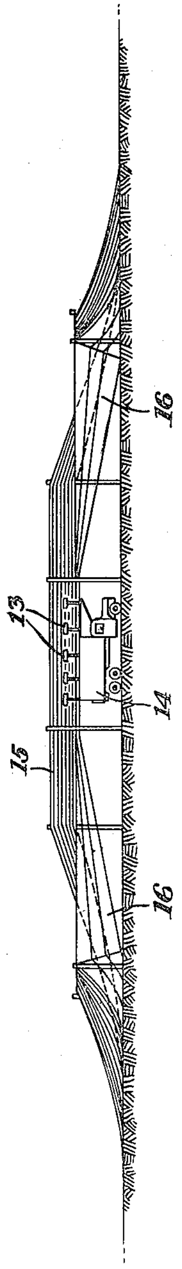

In Figs. 9 and 10 is shown a typical arrangement of the vertical and horizontal screens used with a portable localizer beacon comprising five horizontal loops which may be mounted on a truck trailer, for example, as shown at 14. The vertical reflector 15 may be supported at a given distance preferably a half wavelength or more behind the beacon, the wires of this horizontal reflector screen being terminated in the same manner as shown in Figs. 1 and 2. The horizontal radiation screen 16 is illustrated as extending over an angle of 60° on both sides of the beacon, the wires of this horizontal screen being arranged substantially at the level of the top surface of truck 14 and being terminated similarly to those shown in Figs. 5 and 6.

Figure 12:
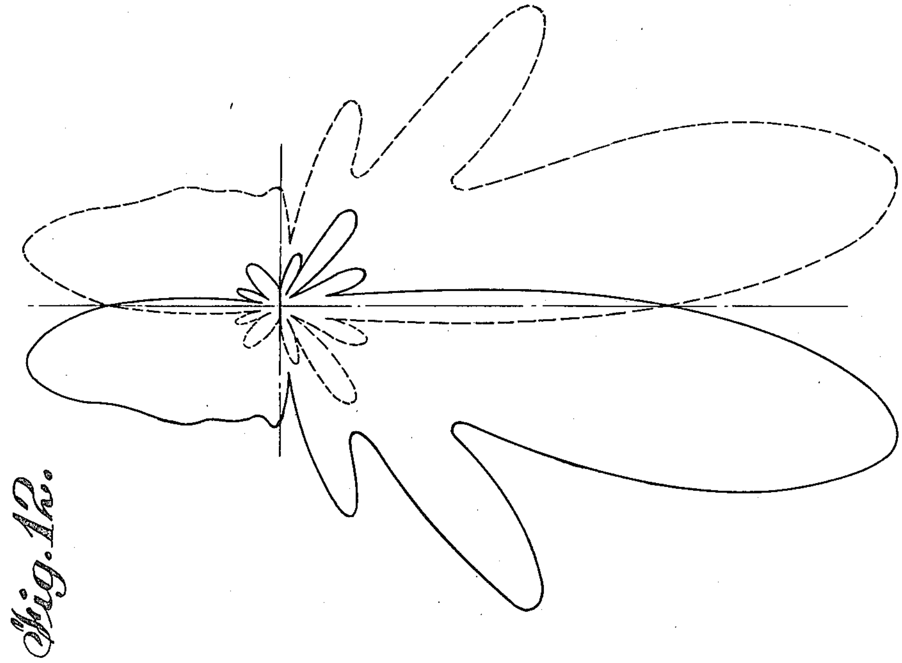
Figure 11:
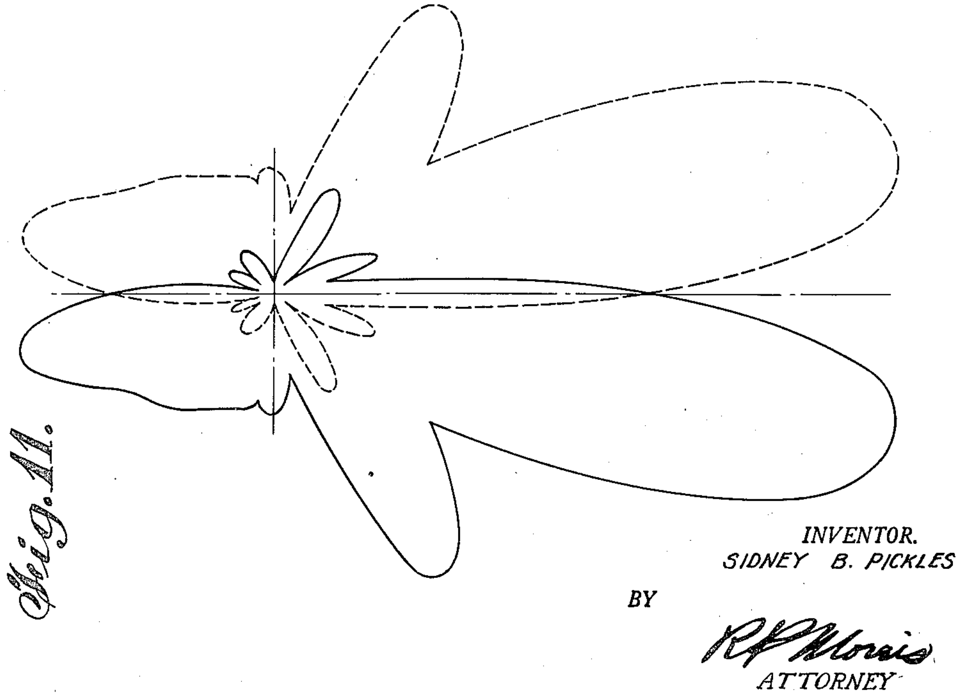

In Figs. 11, 12 and 13 are shown the radiation patterns for a localizer beacon of the type shown in Figs. 9 and 10 arranged 1, 1½ and 2 wavelengths respectively behind the localizer. The localizer radiation patterns are shown in solid line and dotted line fashion to indicate two overlapping beams providing the localizer course. It will be noted that with the localizer arranged one wavelength in front of the screen reflecting object located approximately 40° from the course line will be rendered considerably less damaging because of the minimum in this region. As shown in Fig. 11, the screen reduces the signal at 40° compared to the same region without the screen approximately 6½ decibels. This is nearly as great a reduction as occurs in the case of the rearwardly directed signals compared with the forwardly directed signals.

In Fig. 12 a reflecting object may be at an angle of about 33° with respect to the course and still be appreciably shielded so as to cause a minimum of difficulties. In this case there is another minimum of 60° which may also be of use.

In the event that a reflecting object makes an angle of 28° with respect to the course, the screen spaced two wavelengths to the rear of the localizer will provide appreciable screening protection as will be clear from reference to Fig. 13. The screening action of the screen is not impaired greatly to any screen spacing up to two wavelengths behind the beacon. This holds true for any screen which extends a sufficient distance above and below the radiating antennas. For example, if the screen extends three feet above and three feet below the height of the beacon antennas, operating at an operating frequency of 110 megacycles no damaging rearwardly reflection will be produced.

Figure 14:
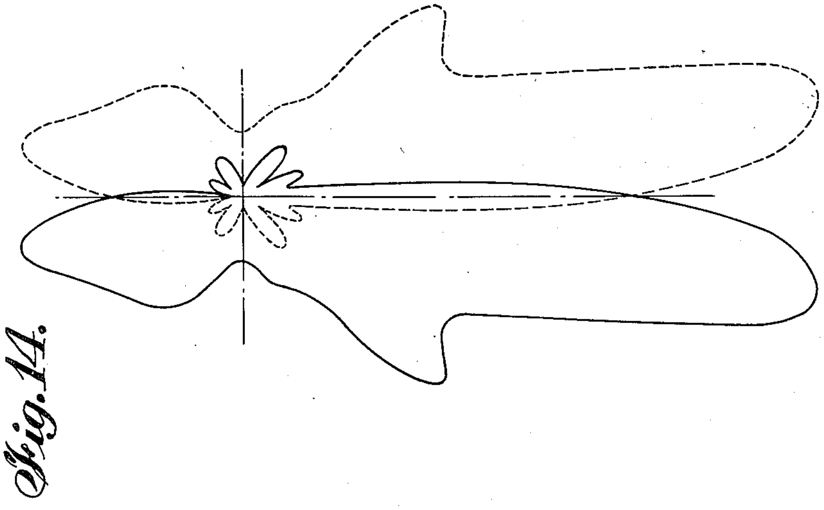
Fig. 14 is an illustration of radiation pattern from a localizer beacon such as shown in Fig 10.

In Fig. 14 is illustrated the radiation pattern produced by the combination of vertical and horizontal screens such as shown in Figs. 9 and 10 when used with a localizer beacon. In this case, the pattern is shown for the terminated screen placed 1½ wavelengths back of the antenna and the two fan-shaped screens extending from 30° to 90° on each side of the course.

Figure 15:
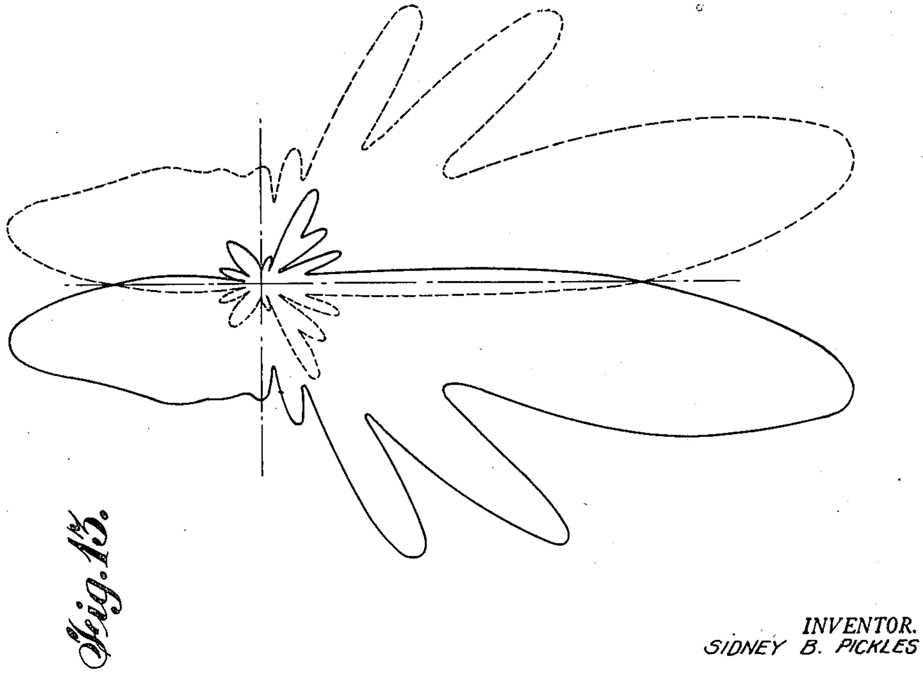
Fig. 15 is a diagrammatic plan view of a radio beacon installation at an airport illustrating reflecting objects, the effects of which are minimized by the use of my invention.
Figure 15:
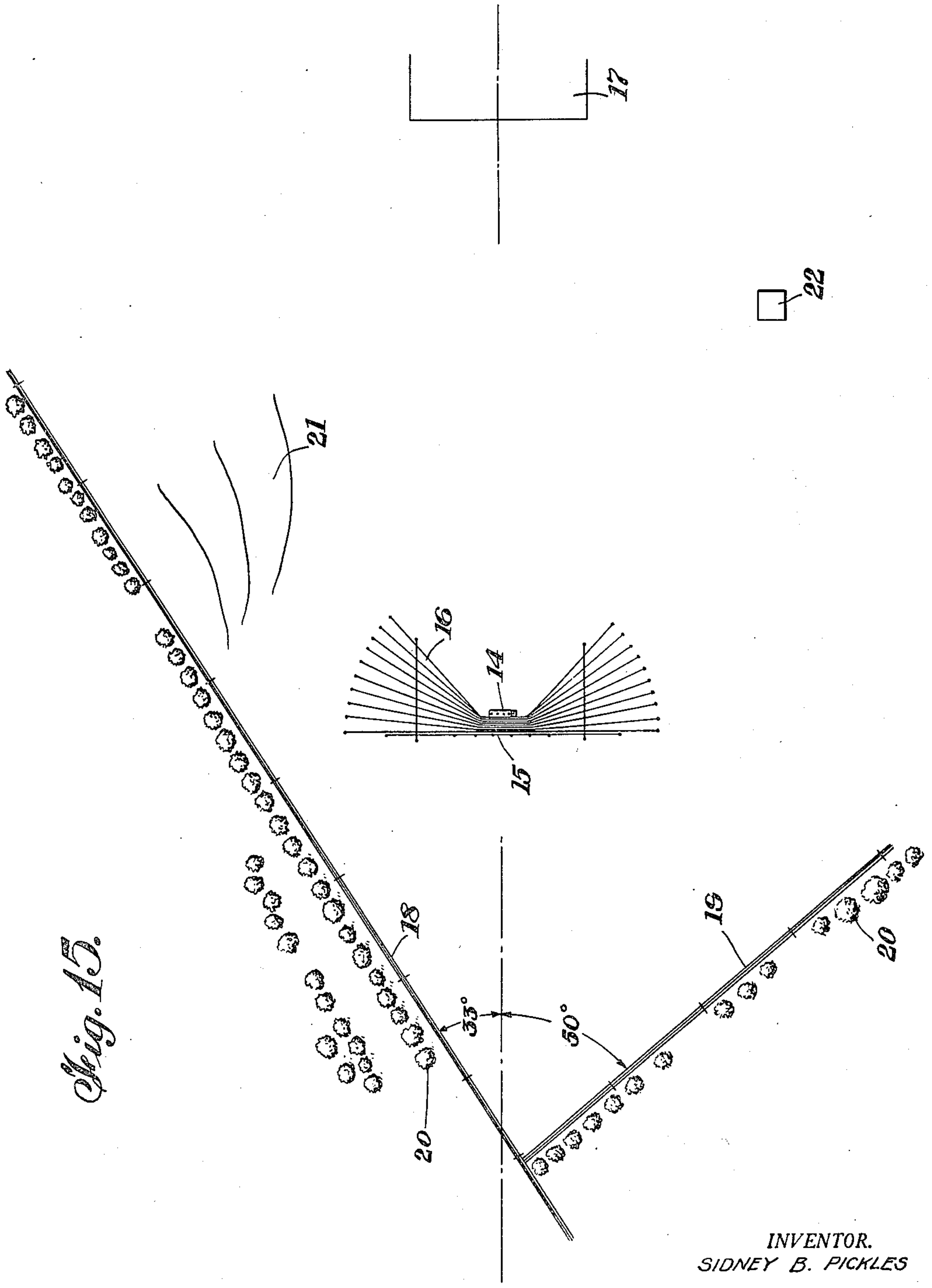

A typical landing field set up utilizing the the screening systems in accordance with my invention is shown in Fig. 15. In this arrangement the localizer 14 is shown arranged in spaced relationship with respect to a runway 17. The spacing may be any desirable distance, for example 500 feet. The vertical and horizontal screens 15 and 16 serve to minimize effects on the localizer pattern from the reflections from power lines 18 and 19 to the rear and in forward directions of the radio beacon as well as the trees 20 which may be also around the airport. A hill 21 is also shown as an obstacle in the left forward direction of the beacon 14. Another smaller reflecting object 22 is shown located forwardly of the antenna at an angle in which protection from the radiation is desired. By utilizing the screening arrangements outlined in accordance with my invention, the effect of all of these undesired reflecting objects may be greatly minimized as explained above.

While I have described my invention in connection with certain specific embodiments thereof, it should be clearly understood that these are given by way of illustration only. Many modifications within the scope of my invention will occur to those skilled in the art. It is therefore to be distinctly understood that the illustrated examples are not to be considered as a limitation on my invention as set forth in the objects thereof and in the accompanying claims.

I claim:

1. A system for controlling the forward radiation pattern of a horizontally polarized radiating array comprising antenna means, and a radiation absorbing screen mounted behind said antenna, said screen being comprised of a plurality of wire conductors substantially horizontally disposed in a common vertical plane above ground and energy dissipating termination means coupled to each of said wires at each of its two ends.

2. A system according to claim 1, wherein said termination means comprises extensions of each of said wires disposed at gradually decreasing heights above ground.

3. A system according to claim 1, wherein said termination means comprise high resistance elements at each end of each of said wires.

SIDNEY B. PICKLES.

REFERENCES CITED

The following references are of record in the file of this patent:

UNITED STATES PATENTS

| Number | Name | Date |
|---|---|---|
| 1,745,342 | Yagi | Jan. 28, 1930 |
| 1,746,436 | Messner | Feb. 11, 1930 |
| 1,764,441 | Hahnemann | June 17, 1930 |
| 1,781,046 | Bethenod | Nov. 11, 1930 |
| 1,805,591 | Ohl | May 19, 1931 |
| 1,830,176 | Schroter | Nov. 3, 1931 |
| 2,081,162 | Alford | May 25, 1937 |
| 2,292,342 | Schelkunoff et al. | Aug. 4, 1942 |

FOREIGN PATENTS

| Number | Country | Date |
|---|---|---|
| 402,834 | Great Britain | Dec. 14, 1933 |